(12) United States Patent
Kini et al.

(10) Patent No.: US 8,411,701 B2
(45) Date of Patent: Apr. 2, 2013

(54) INTER-WORKING OF EFM-OAM AND CFM-OAM FOR MOBILE BACKHAUL NETWORKS

(75) Inventors: Sriganesh Kini, Fremont, CA (US); Rishi Mehta, San Jose, CA (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 397 days.

(21) Appl. No.: 12/757,774

(22) Filed: Apr. 9, 2010

(65) Prior Publication Data

US 2011/0249567 A1   Oct. 13, 2011

(51) Int. Cl.
*H04J 3/16* (2006.01)
(52) U.S. Cl. .................. 370/467; 370/236.2; 370/241.1
(58) Field of Classification Search .............. 370/236.2, 370/241.1, 465–467
See application file for complete search history.

(56) References Cited

U.S. PATENT DOCUMENTS

2006/0159008 A1* 7/2006 Sridhar et al. ............... 370/244
2007/0025256 A1   2/2007 Hertoghs et al.

FOREIGN PATENT DOCUMENTS

EP    1596531       11/2005
WO   WO-2006076493   7/2006

OTHER PUBLICATIONS

International Search Report and Written Opinion; International Application No. PCT/IB2011/051422 dated Apr. 2, 2011; 13 pages, 11 pages.
IEEE computer Society; 802.1ag-IEEE Standard for local and metropolitan area networks—Virtual Bridged Local Area Networks—Amendment 5: Connectivity Fault Management; 3 pages, Year: 2007.

* cited by examiner

*Primary Examiner* — Pao Sinkantarakorn
(74) *Attorney, Agent, or Firm* — Blakely Sokoloff Taylor & Zafman, LLP

(57) ABSTRACT

On a first network element in a radio access network (RAN), supporting operations, management and administration (OAM) between network elements that support Ethernet in the first mile (EFM) and network elements that support connectivity fault management (CFM) in the radio access network by receiving an EFM message from a second network element that supports EFM, wherein the second network element is in the RAN and wherein the EFM message includes OAM data; converting the OAM data from the EFM message into a sub-type-length-value (sub-TLV) of a CFM message; and transmitting the CFM message including the OAM data in the sub-TLV to a third network element that supports CFM, wherein the third network element is in the RAN, whereby an end-to-end OAM sublayer is provided in the RAN by conversion of OAM data from EFM to CFM.

18 Claims, 4 Drawing Sheets

INTER-WORKING OF EFM-OAM AND CFM-OAM FOR MOBILE BACKHAUL NETWORKS

FIELD OF THE INVENTION

The embodiments of the invention relate to operation, administration and management (OAM) protocols. Specifically, the embodiments of the invention relate to a method and system for providing end-to-end OAM in a radio access network.

BACKGROUND

Radio access networks (RAN) are networks for providing communication between cell sites, which provide cellular communication with handsets, and a network backbone or backhaul that connects the cell sites to other cell sites or phone systems. A RAN is typically considered to consist of two distinct topological parts. A LowRAN, or access RAN, is a portion of the network that is comprised of a point-to-point topology between the cell site and an aggregation point. A HiRAN consists of a high capacity and highly redundant aggregation network composed of a plurality of aggregation nodes. These aggregation nodes connect the cell sites to the backhaul or backbone network.

Many RAN operators design backhaul networks based on Ethernet as a transport and aggregation layer. Newer RANs include HiRANs that are based on a metro Ethernet network architecture. This metro Ethernet network architecture is based on provider bridging architecture, virtual private line services (VPLS), provider backbone bridges (PBB)/provider backbone transport (PBT) or a combination of these technologies. Operators also design these architectures with Connectivity Fault Management (CFM) (IEEE 802.1ag) as a basic requirement for OAM. The nodes in the aggregation network thus implement CFM.

A LowRAN does not support CFM. Rather, the LowRAN supports Ethernet in the first mile (EFM) (IEEE 802.3ah). CFM is not suited for use in the LowRAN, because it is a complex resource-intensive protocol. Equipment in the LowRAN do not typically have sufficient hardware and software capability to support CFM. Upgrading or providing sufficient resources in the equipment in the cell sites in LowRAN is expensive. As a result, the RAN operators can only take advantage of the CFM-OAM functionality up to the LowRAN, that is, within the HiRAN. This makes it more difficult to debug issues related to connectivity or quality degradation in the LowRAN, requiring an onsite visit to the cell site in many cases.

SUMMARY

The embodiments of the invention include a method performed on a first network element in a radio access network (RAN), the method to support operations, management and administration (OAM) between network elements that support Ethernet in the first mile (EFM) and network elements that support connectivity fault management (CFM) in the radio access network, the method comprising the steps of: receiving an EFM message from a second network element that supports EFM, wherein the second network element is in the RAN and wherein the EFM message includes OAM data; converting the OAM data from the EFM message into a sub-type-length-value (sub-TLV) of a CFM message; and transmitting the CFM message including the OAM data in the sub-TLV to a third network element that supports CFM, wherein the third network element is in the RAN, whereby an end-to-end OAM sublayer is provided in the RAN by conversion of OAM data from EFM to CFM.

A method performed on a first network element in a radio access network (RAN), the method to support operations, management and administration (OAM) between network elements that support Ethernet in the first mile (EFM) and network elements that support connectivity fault management (CFM) in the radio access network, the method comprising the steps of: receiving a CFM message from a second network element that supports CFM, wherein the second network element is in the RAN and wherein the CFM message includes OAM data; converting the OAM data from the CFM message into an EFM message based on a sub-type-length-value (sub-TLV) in the CFM message; and transmitting the EFM message including the OAM data to a third network element that supports EFM, wherein the third network element is in the RAN, whereby an end-to-end OAM sublayer is provided in the RAN by conversion of OAM data from CFM to EFM.

A network element in a radio access network (RAN), the network element to support operations, management and administration (OAM) between network elements that support Ethernet in the first mile (EFM) and network elements that support connectivity fault management (CFM) in the radio access network, the system comprising: an EFM-OAM module to process a first EFM message including OAM data received from a first network element that supports EFM, wherein the first network element is on the RAN; an EFM-CFM translation module coupled to the EFM-OAM module adapted to convert OAM data from the first EFM message into a sub-type-length-value (sub-TLV) of a first CFM message; and a CFM-OAM module adapted to process the first CFM message including the OAM data in the sub-TLV and transmit the first CFM message to a third network element that supports CFM, wherein the third network element is in the RAN, whereby an end-to-end OAM sublayer is provided in the RAN by conversion of OAM data from EFM to CFM and conversion of OAM data from CFM to EFM.

A system in a radio access network (RAN), the system to support operations, management and administration (OAM) between network elements that support Ethernet in the first mile (EFM) and network elements that support connectivity fault management (CFM) in the radio access network, the system comprising: a cell site node adapted to generate a first EFM-OAM message and to transmit the first EFM-OAM message to a first aggregation node, wherein the cell site node supports EFM and the cell site node is on the RAN; the first aggregation node adapted to process a first EFM message including OAM data received from cell site, wherein the first aggregation node supports CFM and wherein the first aggregation node is on the RAN, the first aggregation node adapted to convert OAM data from the first EFM message into a sub-type-length-value (TLV) of a first CFM message, adapted to process the first CFM message including the OAM data in the sub-TLV and adapted to transmit the first CFM message to a third network element on the RAN, a second aggregation node adapted to receive the first CFM message and adapted to transmit the second CFM message to the first aggregation node, wherein the second aggregation node supports CFM and wherein the second aggregation node is on the RAN, whereby an end-to-end OAM sublayer is provided in the RAN by conversion of OAM data from EFM to CFM and conversion of OAM data from CFM to EFM.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DETAILED DESCRIPTION

Figure 1:
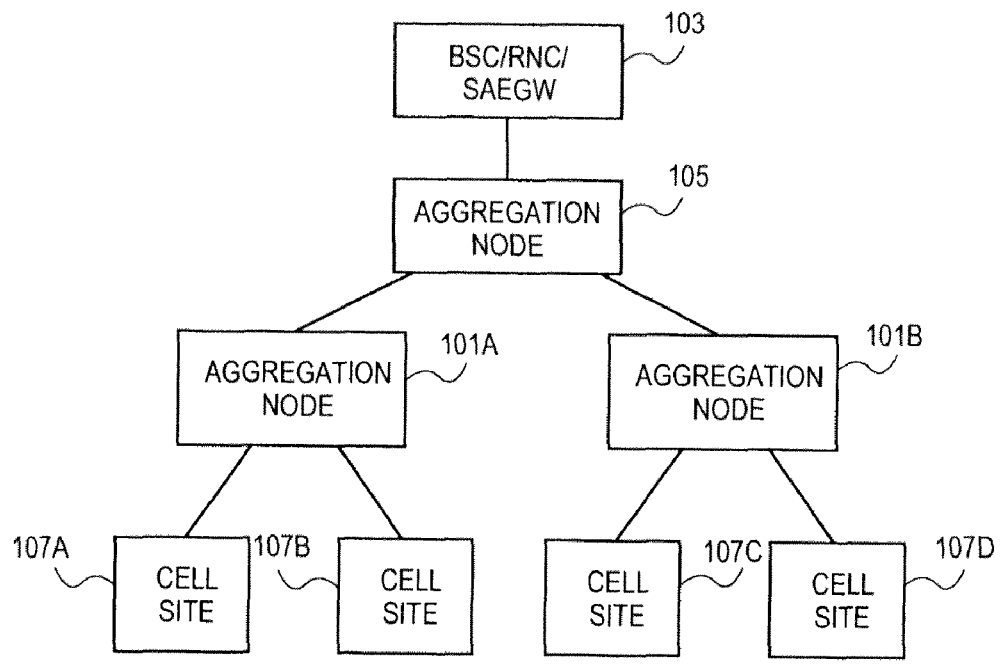
FIG. 1 is diagram of one embodiment of a radio access network.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art that the invention may be practiced without such specific details. Those of ordinary skill in the art, with the included descriptions, will be able to implement appropriate functionality without undue experimentation.

The operations of the flow diagrams will be described with reference to the exemplary embodiments of FIGS. 1 and 2. However, it should be understood that the operations of the flow diagrams can be performed by embodiments of the invention other than those discussed with reference to FIGS. 1 and 2, and the embodiments discussed with reference to FIGS. 1 and 2 can perform operations different than those discussed with reference to the flow diagrams of FIGS. 3-6.

The techniques shown in the figures can be implemented using code and data stored and executed on one or more electronic devices (e.g., an end station, a network element, etc.). Such electronic devices store and communicate (internally and/or with other electronic devices over a network) code and data using machine-readable or computer-readable media, such as machine-readable or computer-readable storage media (e.g., magnetic disks; optical disks; random access memory; read only memory; flash memory devices; and phase-change memory). In addition, such electronic devices typically include a set of one or more processors coupled to one or more other components, such as one or more storage devices, user input/output devices (e.g., a keyboard, a touch screen, and/or a display), and network connections. The coupling of the set of processors and other components is typically through one or more busses and bridges (also termed as bus controllers). The storage device and signals carrying the network traffic respectively represent one or more machine-readable or computer-readable storage media and machine-readable or computer-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

As used herein, a network element (e.g., a router, switch, bridge, etc.) is apiece of networking equipment, including hardware and software, that communicatively interconnects other equipment on the network (e.g., other network elements, end stations, etc.). Some network elements are "multiple services network elements" that provide support for multiple networking functions (e.g., routing, bridging, switching, Layer 2 aggregation, session border control, multicasting, and/or subscriber management), and/or provide support for multiple application services (e.g., data, voice, and video). Subscriber end stations (e.g., servers, workstations, laptops, palm tops, mobile phones, smart phones, multimedia phones, Voice Over Internet Protocol (VOIP) phones, portable media players, GPS units, gaming systems, set-top boxes (STBs), etc.) access content/services provided over the Internet and/or content/services provided on virtual private networks (VPNs) overlaid on the Internet. The content and/or services are typically provided by one or more end stations (e.g., server end stations) belonging to a service or content provider or end stations participating in a peer to peer service, and may include public web pages (free content, store fronts, search services, etc.), private web pages (e.g., username/password accessed web pages providing email services, etc.), corporate networks over VPNs, IPTV, etc. Typically, subscriber end stations are coupled (e.g., through customer premise equipment coupled to an access network (wired or wirelessly) to edge network elements, which are coupled (e.g., through one or more core network elements to other edge network elements) to other end stations (e.g., server end stations).

The embodiments of the present invention provide a system, network and method for avoiding the disadvantages of the prior art including: having to make site visits to diagnose connectivity and similar issues in equipment in the LowRAN; and the inability to remotely configure and debug equipment in the LowRAN.

The embodiments of the invention overcome these disadvantages by defining a type length value (TLV) in a CFM message to encode or encapsulate EFM-OAM status information and EFM-OAM responses to CFM requests thereby enabling end-to-end OAM in the RAN.

FIG. 1 is a diagram of one embodiment of a radio access network. The radio access network is comprised of a number of cell sites 107A-107D, a number of aggregation nodes 101A, 101B and 105 and a base station controller (BSC), radio network controller (RNC), system architecture evolution gateway (SAEGW) or similar component. The radio access network illustrated in FIG. 1 is provided by way of example and one of ordinary skill in the art would understand that a radio access network may have any number of cell sites and aggregation nodes. Further, the aggregation nodes may have any number of layers and there may be multiple BSCs, RNCs or SAEGWs, as well as connections to other networks such as public switched telephone networks (PSTNs).

The BSC, RNC or SAEGWs 103 as well as some aggregation nodes 101A, 101B, 105 can enable a RAN operator to monitor and configure the various components of the RAN using OAM. The BSC, RNC or SAEGW can be devices such as the EVO 8000 Controller produced by Telefonaktiebolaget L. M. Ericsson. Aggregation nodes 101A, 101B and 105 can be network elements such as EMN120 produced by Telefonaktiebolaget L. M. Ericsson. Cell sites 107A-107D can include equipment such as RBS 6000 produced by Telefonaktiebolaget L. M. Ericsson.

The BSC, RNC and SAEGW function to manage the data traffic on the RAN as well as intercommunication between the RAN and other networks. Aggregation nodes 101A, 101B and 105 function to route traffic from cell sites 107A-107D to one another as well as from the cell sites 107A-107D to the BSC, RNC or SAEGW 103. The cell sites 107A-107D communicate bidirectionally with mobile handsets and similar devices to enable voice and data communication.

Figure 2:
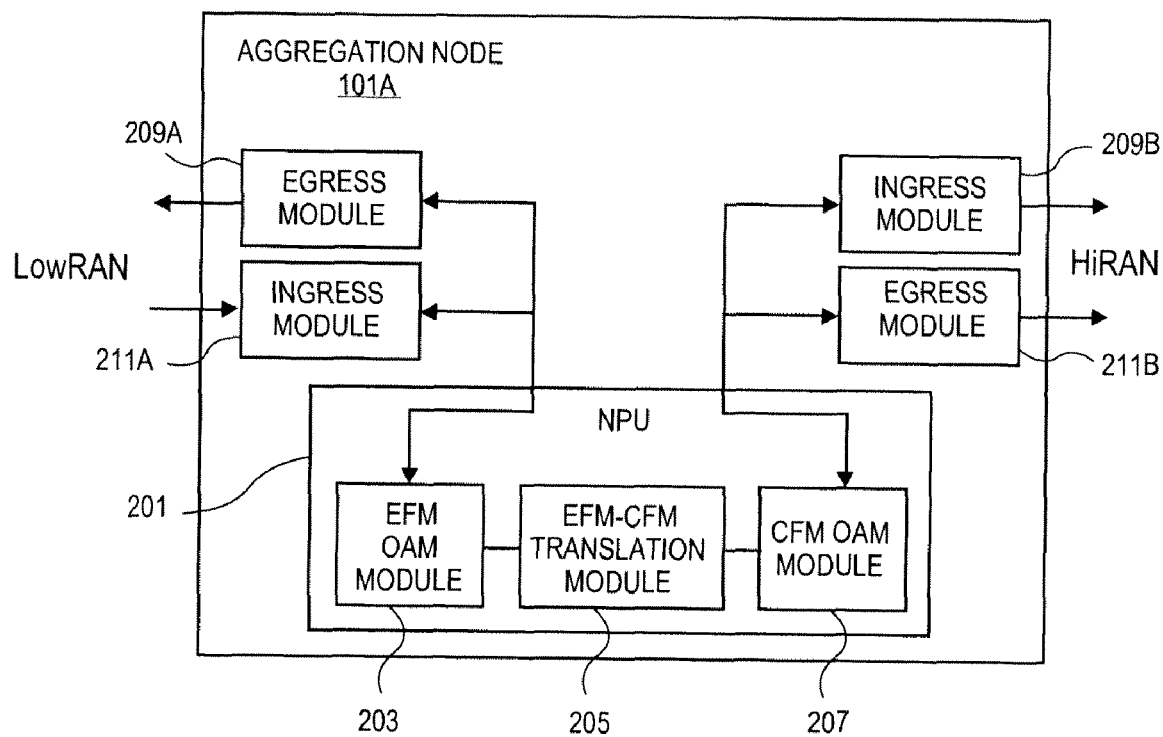
FIG. 2 is a diagram of one embodiment of an aggregation node.

FIG. 2 is a diagram of one embodiment of an aggregation node 101A that implements OAM conversion between EFM and CFM. The aggregation node 101A can include a set of ingress modules 211A, 209B and egress 209A, 211B modules. These modules process incoming and outgoing traffic received or transmitted through associated ports. In one embodiment, separate ingress modules 211A, 209B and egress modules 209A, 211B can be provided for port of the aggregation node 101A. These ingress modules 211A, 209B and egress modules 209A, 211B can be designated for separate virtual or physical ports or can be shared amongst sets of virtual or physical ports. One set of ingress modules and egress modules 209A, 211A provide a port for the transmission of traffic between aggregation node 101A and the LowRAN upon which any number of cell sites may be present. Another set of ingress modules and egress modules 209B, 211B provide a port for communication with the HiRAN including other aggregation nodes and the BSC, RNC or SAEGW.

A network processing unit (NPU) 201 manages the traffic that is received, forwarded and processed by the aggregation node 101A. The NPU 201 may include an EFM-OAM module 203, an EFM-CFM translation module 205 and a CFM-OAM module 207. In other embodiments, the NPU may not include an EFM-OAM module. The EFM-OAM module receives traffic from the LowRAN and identifies and processes EFM (802.3ah-OAM) traffic. This traffic is then provided to the EFM-CFM translation module 205 to be converted into a format compatible with CFM so that the OAM data can be made available to other aggregation nodes and the BSC, RNC or SAEGW. Thus, the OAM data from the LowRAN provided in the form of EFM OAM can be made available to aggregation nodes in the HiRAN as well as the BSC, RNC and SAEGW in the form of CFM-OAM. After the data is converted to CFM format, it is provided to a CFM-OAM module 207. The CFM-OAM module generates a CFM message including the translated OAM data and forwards it on to the HiRAN. The CFM OAM module also receives CFM-OAM messages from aggregation nodes and the BSC, RNC or SAEGW on the HiRAN and then processes these CFM-OAM messages. These messages may include requests for OAM data from nodes on the LowRAN. These requests are forward to the EFM-CFM translation module 205. The EFM-CFM translation module may generate an EFM message to forward the request or it may service the request based on information provided from the modules on the LowRAN using EFM-OAM.

In one embodiment, the EFM-CFM translation module may be implemented by configuration of an Up-message exchange pattern (Up-MEP) for a port tied to the LowRAN. An Up-MEP is defined in 802.1ag (CFM). An Up-MEP is a monitoring point in an Ethernet network that originates continuity check messages. The 'Up' denotes that the message is not sent downstream directly to the port, but rather into the Ethernet device. Further, a sub-TLV structure for messages in the CFM protocol, specifically the protocols' organization specific TLVs (IEEE 802.1ag, Section 21.5.2) can be used to provide OAM data related to the LowRAN to nodes supporting CFM in the HiRAN. These sub-TLV types can be define and utilized in connection with specific types of CFM protocol data units such as loopback and continuity check PDUs. For example, the sub-TLV types shown below in Table 1.

TABLE 1

| Type | Description | CFM PDUs these TLVs go in |
| --- | --- | --- |
| 1 | 802.3ah OAM alert flags | CC |
| 2 | 802.3ah OAMPDU request | LB |
| 3 | 802.3ah encapsulated OAMPDU | LB |

The sub-TLV type 1 can be a 32 bit value. The first three bits or any 3 bits in the value can be used to describe the discovery state of a network element such as a node or cell site on the LowRAN. Other bits in the sub-TLV type can be used as a set of flags as set forth in Table 2 below. This sub-TLV is inserted into a continuity check message, i.e., a CFM continuity check PDU. The discovery state is a direct encoding of the discovery state of the network element such that a cell site operational status can be provided by that cell site using EFM. The defined flags can include a Pending Information OAMPDU that is set when an Information OAMPDU is received in the EFM message from a cell site or similar node. Similarly, another flag can be defined that indicates a Pending Event Notification OAMPDU has been received from a cell site or similar node using EFM. Other flags are described in an example embodiment in Table 2 below.

TABLE 2

| Flag bit Position | Flag description |
| --- | --- |
| 0x1, 0x2, 0x4 | Discovery state |
| | 0x1 - FAULT |
| | 0x2 - ACTIVE_SEND_LOCAL |
| | 0x3 - PASSIVE_WAIT |
| | 0x4 - SEND_LOCAL_REMOTE |
| | 0x5 - PASSIVE_WAIT |
| | 0x6 - SEND_LOCAL_REMOTE_OK |
| | 0x7 - SEND_ANY |
| 0x8 | Pending Information OAMPDU |
| 0x10 | Pending Event Notification OAMPDU |
| 0x20 | Link fault |
| 0x40 | Dying Gasp |
| 0x80 | Unspecified Critical Event |
| 0x100 | Loopback enable for the port on which the UP-MEP is defined |
| 0x200 | Loopback enabled at local end |

The sub-TLV type 2 provides a way for aggregation nodes in the BSC/RNC/SAEGW on the HiRAN to request the Pending Information and Pending Event Notification OAM PDUs available at the aggregation node providing the EFM-CFM translation. There is a OAMPDU request type field in the value of this TLV to designate the type of request, i.e., a Request for Information OAMPDU or a Request for Event Notification OAMPDU.

The third type of sub-TLV defined for CFM messages provides a way to encapsulate an EFM OAMPDU into a CFM message. The loopback (LB) request type of CFM message can be used in response and contain this sub-TLV. This, for example, can be used to perform EFM operations such as variable requests/response, remote loopback and also for communication of OAMPDUs such as the Information OAMPDUs and the Event Notification OAMPDUs.

It should be noted that there may be multiple instances of the EFM-CFM translation module, Up-MEPs that are configured for separate VLANs that operate on the RAN or, specifically, the LowRAN or the port associated with the LowRAN. In one embodiment, there can be a many to one relationship between the nodes in the HiRAN that can initiate OAM procedures in these Up-MEPs or EFM-CFM translation module instances.

Figure 3:
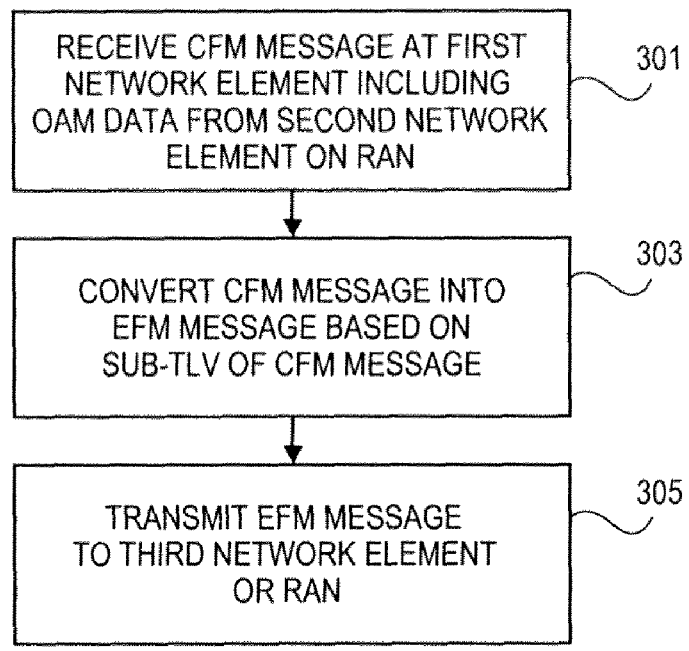
FIG. 3 is a flowchart of one embodiment of a process for converting CFM-OAM to EFM-OAM.

FIG. 3 is a flowchart of one embodiment of the process of servicing a CFM message including OAM data. In one embodiment, this process is initiated by receiving a CFM message at the network element that is implementing the translation process (Block 301). The sub-TLV defined as above is examined in the CFM message to determine the type of OAM data that has been received. Based on the type of OAM data being received, it is converted to a corresponding EFM-OAM message type (Block 303). In other embodiments or in other instances, CFM-OAM data may be a request for OAM data from the LowRAN that is independently provided by EFM messages and not in direct response to the CFM request. In this case, the data is available and returned in a CFM-OAM message with an appropriate sub-TLV including or encapsulating the quested information.

In another embodiment, the EFM message including the converted OAM data is transmitted to a third network element on the RAN (Block 305). This third network element may be a cell site or similar node in the LowRAN, which then services the OAM data (e.g., such as a command or request) in the EFM message. In some embodiments or instances, this can initiate a response from the node in the LowRAN in response to processing the received EFM-OAM message.

Figure 4:
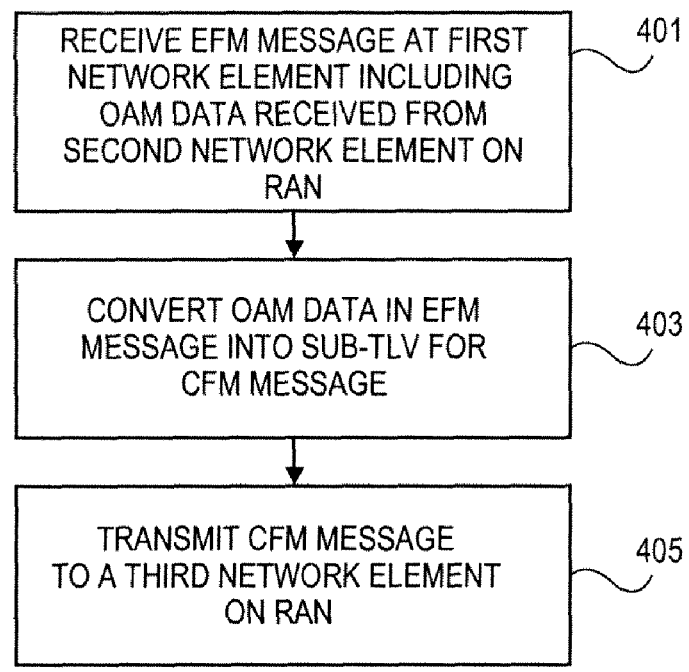
FIG. 4 is a flowchart of one embodiment of a process for converting EFM-OAM to CFM-OAM.

FIG. 4 is a flowchart of one embodiment of a process for converting EFM-OAM messages to CFM. In one embodiment, this process is initiated in response to receiving an EFM message that includes OAM data at the network element implementing the translation (Block 401). The EFM-OAM data is received from another network element such as a cell site or similar node implementing the EFM. The EFM-OAM data is analyzed to determine the type of data provided and is converted into a corresponding sub-TLV to be inserted into a CFM message (Block 403). The different types of EFM-OAM messages have two or more types of sub-TLVs defined for them as described above. The corresponding sub-TLV is inserted into a CFM message and transmitted to a third network element on the RAN (Block 405). This third network element can be another aggregation node or can be a BSC, RNC or SAEGW. The CFM message can be forwarded through any number of additional nodes on the HiRAN. Any nodes on the HiRAN can include software that makes them aware of the sub-TLV types and able to process the data stored therein to enable the end-to-end OAM sublayer for the RAN.

Figure 5:
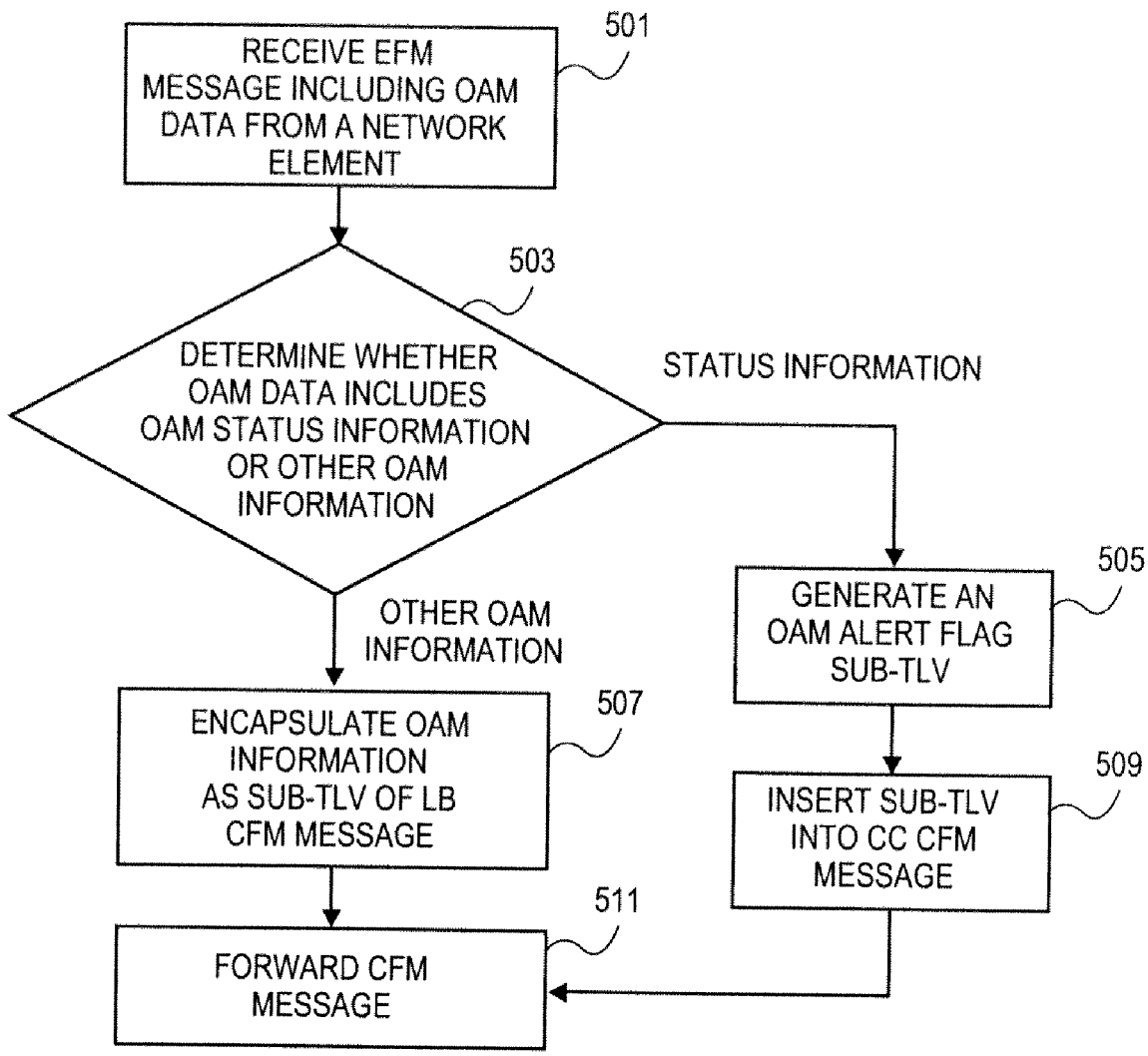
FIG. 5 is a flowchart of one embodiment of a process for converting EFM-OAM to CFM-OAM.

FIG. 5 is a flowchart of one embodiment of the process for handling an EFM message including OAM data. In this embodiment, an EFM message is received that includes OAM data from a network element on the LowRAN such as a cell site (Block 501). This is received at an aggregation node or similar node that implements the conversion between EFM-OAM and CFM-OAM. The OAM data is then examined to determine whether it includes OAM status information or other OAM information (Block 503). Other OAM information can include Event Notification OAMPDUs or Information OAMPDUs that are a part of the EFM message, whereas status information relates to the discovery state of the nodes sending the EFM message. If the OAM data includes other OAM information, the OAM information is encapsulated as a sub-TLV of a loopback CFM message (Block 507). That loopback CFM message is then forwarded to the next aggregation node or towards the BSC, RNC or SAEGW (Block 511).

If status information has been received, then an OAM alert flag sub-TLV is generated (Block 505). This alert flag sub-TLV is inserted into a continuity check CFM message (Block 509). The continuity check CFM message is then forwarded on to the next aggregation node or towards the BSC, RNC or SAEGW on the HiRAN (Block 511). Encapsulating and forwarding this OAM data makes it available to any node on the HiRAN that has software that is aware of these sub-TLV definitions.

Figure 6:
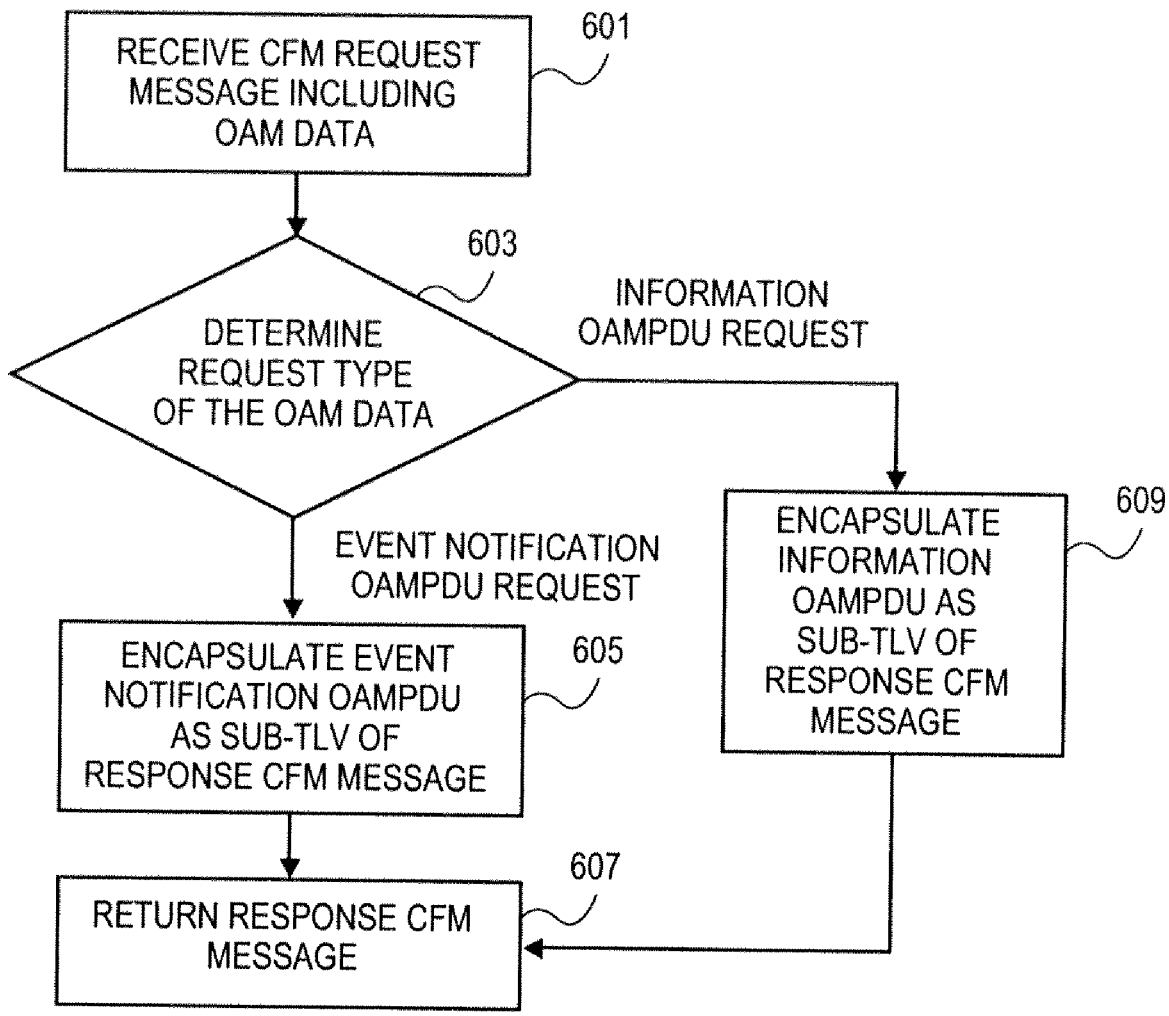
FIG. 6 is a diagram of one embodiment of a process for converting CFM-OAM to EFM-OAM.

FIG. 6 is a flowchart of one embodiment of a process for handling CFM request messages including OAM data. The process can be initiated in response to receiving a CFM request message including OAM data from another aggregation node or the BSC, RNC or SAEGW (Block 601). The CFM request message is then analyzed to determine the request type of the OAM data (Block 603). The request can be for an Information OAMPDU or an Event Notification OAMPDU that had previously been received in an EFM message from an EFM node such as a cell site. If the request is for an Information OAMPDU, then the Information OAMPDU is encapsulated as a sub-TLV of a response CFM message (Block 609). The sub-TLV is inserted the response CFM message and returned to the requesting aggregate node or BSC, RNC or SAEGW. If the request is for an Event Notification OAMPDU, then the Event Notification OAMPDU is encapsulated as a sub-TLV of a response CFM message (Block 605). The response CFM message including the sub-TLV is then returned to the requesting aggregation node, BSC, RNC or SAEGW (Block 607).

It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method performed on a first network element functioning as an aggregation node in a radio access network (RAN), the method to support operations, management and administration (OAM) between network elements in a LowRAN portion of the RAN that support Ethernet in the first mile (EFM) and network elements in a HiRAN portion of the RAN that support connectivity fault management (CFM) in the radio access network, wherein the LowRAN portion is a point-to-point topology between a cell site and the aggregation node and wherein the HiRAN portion is a network of a plurality of aggregation nodes connected to a backhaul network of the RAN, the method comprising the steps of:

receiving an EFM message at the aggregation node from a second network element that is a cell site in the LowRAN that supports EFM, wherein the EFM message includes OAM data;

converting by the aggregation node the OAM data from the EFM message into a sub-type-length-value (sub-TLV) of a CFM message; and transmitting by the aggregation node the CFM message including the OAM data in the sub-TLV to a third network element that supports CFM, wherein the third network element is an aggregation node in the HiRAN, whereby an end-to-end OAM sublayer is provided in the RAN between the cell site and the backhaul network by conversion of OAM data from EFM to CFM.

2. A method performed on a first network element in a radio access network (RAN), the method to support operations management and administration (OAM) between network elements that support Ethernet in the first mile (EFM) and network elements that support connectivity fault management (CFM) in the radio access network, the method comprising the steps of:

receiving an EFM message from a second network element that supports EFM, wherein the second network element is in the RAN and wherein the EFM message includes OAM data;

generating an OAM alert flag sub-TLV in response to determining that the OAM data in the EFM message includes OAM status information;

inserting the OAM alert flag sub-TLV into a continuity check CFM message; and transmitting the continuity check CFM message including the OAM data in the sub-TLV to a third network element that supports CFM, wherein the third network element is in the RAN, whereby an end-to-end OAM sublayer is provided in the RAN by conversion of OAM data from EFM to CFM.

3. A method performed on a first network element in a radio access network (RAN), the method to support operations, management and administration (OAM) between network elements that support Ethernet in the first mile (EFM) and network elements that support connectivity fault management (CFM) in the radio access network the method comprising the steps of:

receiving an EFM message from a second network element that supports EFM, wherein the second network element is in the RAN and wherein the EFM message includes OAM data;

encapsulating an OAM protocol data unit as a sub-TLV of a loop back CFM message, in response to determining that the EFM message includes OAM data; and transmitting the loop back CFM message including the OAM data in the sub-TLV to a third network element that supports CFM, wherein the third network element is in the RAN, whereby an end-to-end OAM sublayer is provided in the RAN by conversion of OAM data from EFM to CFM.

4. A method performed on a first network element functioning as an aggregation node in a radio access network (RAN), the method to support operations, management and administration (OAM) between network elements in a LowRAN portion of the RAN that support Ethernet in the first mile (EFM) and network elements in a HiRAN portion of the RAN that support connectivity fault management (CFM) in the radio access network, wherein the LowRAN portion is a point-to-point topology between a cell site and the aggregation node and wherein the HiRAN portion is a network of a plurality of aggregation nodes connected to a backhaul network of the RAN, the method comprising the steps of:

receiving a CFM message at the aggregation node from a second network element that supports CFM, wherein the second network element is an aggregation node in the HiRAN and wherein the CFM message includes OAM data;

converting by the aggregation node the OAM data from the CFM message into an EFM message based on a sub-type-length-value (sub-TLV) in the CFM message; and transmitting by the aggregation node the EFM message including the OAM data to a third network element that is a cell site in the LowRAN that supports EFM, whereby an end-to-end OAM sublayer is provided in the RAN between the cell site and the backhaul network by conversion of OAM data from CFM to EFM.

5. A method performed on a first network element in a radio access network (RAN), the method to support operations management and administration (OAM) between network elements that support Ethernet in the first mile (EFM) and network elements that support connectivity fault management (CFM) in the radio access network, the method comprising the steps of:

receiving a CFM message from a second network element that supports CFM, wherein the second network element is in the RAN and wherein the CFM message includes OAM data;

converting the OAM data from the CFM message into an EFM message based on a sub-type-length-value (sub-TLV) in the CFM message;

transmitting the EFM message including the OAM data to a third network element that supports EFM, wherein the third network element is in the RAN;

determining whether the OAM data in the CFM message is an event notification OAM protocol data unit (OAMPDU) request; and encapsulating the event notification OAMPDU as a sub-TLV of a response CFM message, whereby an end-to-end OAM sublayer is provided in the RAN by conversion of OAM data from CFM to EFM.

6. The method of claim 5, further comprising the steps of:

determining whether the OAM data in the CFM message is an information OAM protocol data unit (OAMPDU) request; and encapsulating the information OAMPDU as a sub-TLV of a response CFM message.

7. A network element functioning as an aggregation node in a radio access network (RAN), the network element to support operations, management and administration (OAM) between network elements in a LowRAN portion of the RAN that support Ethernet in the first mile (EFM) and network elements in a HiRAN portion of the RAN that support connectivity fault management (CFM) in the radio access network, wherein the LowRAN portion is a point-to-point topology between a cell site and the aggregation node and wherein the HiRAN portion is a network of a plurality of aggregation nodes connected to a backhaul network of the RAN, the system comprising:

an EFM OAM module in the aggregation node to process a first EFM message including OAM data received from a first network element that is a cell site in the LowRAN that supports EFM;

an EFM-CFM translation module in the aggregation node coupled to the EFM OAM module adapted to convert OAM data from the first EFM message into a sub-type-length-value (sub-TLV) of a first CFM message; and a CFM OAM module in the aggregation node adapted to process the first CFM message including the OAM data in the sub-TLV and transmit the first CFM message to a third network element that supports CFM, wherein the third network element is an aggregation node in the HiRAN, whereby an end-to-end OAM sublayer is provided in the RAN between the cell site and the backhaul network by conversion of OAM data from EFM to CFM and conversion of OAM data from CFM to EFM.

8. The network element of claim 7, wherein the EFM-CFM translation module is adapted to convert OAM data from a second CFM message into a second EFM message based on a sub-type-length-value (TLV) in the second CFM message.

9. A network element in a radio access network (RAN), the network element to support operations, management and administration (OAM) between network elements that support Ethernet in the first mile (EFM) and network elements that support connectivity fault management (CFM) in the radio access network the system comprising:

an EFM OAM module to process a first EFM message including OAM data received from a first network element that supports EFM, wherein the first network element is on the RAN;

an EFM-CFM translation module coupled to the EFM OAM module adapted to convert OAM data from the first EFM message into a sub-type-length-value sub-TLV of a first CFM message and adapted to convert OAM data from a second CFM message into a second EFM message based on a sub-type-length-value (TLV) in the second CFM message, wherein the EFM-CFM translation module is adapted to determine whether the OAM data in the second CFM message is an information OAM protocol data unit (OAMPDU) request, and is adapted to encapsulate the information OAMPDU as a sub-TLV of a response CFM message; and a CFM OAM module adapted to process the first CFM message including the OAM data in the sub-TLV and transmit the first CFM message to a third network element that supports CFM, wherein the third network element is in the RAN, whereby an end-to-end OAM sublayer is provided in the RAN by conversion of OAM data from EFM to CFM and conversion of OAM data from CFM to EFM.

10. The network element of claim 9, wherein the EFM-CFM translation module is adapted to determine whether the OAM data in the second CFM message is an event notification OAM protocol data unit (OAMPDU) request, and is adapted to encapsulate the event notification OAMPDU as a sub-TLV of a response CFM message.

11. A network element in a radio access network RAN the network element to support operations, management and administration (OAM) between network elements that support Ethernet in the first mile EFM and network elements that support connectivity fault management (CFM) in the radio access network, the system comprising:

an EFM OAM module to process a first EFM message including OAM data received from a first network element that supports EFM, wherein the first network element is on the RAN;

an EFM-CFM translation module coupled to the EFM OAM module adapted to convert OAM data from the first EFM message into a sub-type-length-value sub-TLV of a first CFM message, wherein the EFM-CFM translation module is adapted to encapsulate an OAM protocol data unit as a sub-TLV of a loop back CFM message, in response to determining that the first EFM message includes OAM data; and a CFM OAM module adapted to process the first CFM message including the OAM data in the sub-TLV and transmit the first CFM message to a third network element that supports CFM, wherein the third network element is in the RAN, whereby an end-to-end OAM sublayer is provided in the RAN by conversion of OAM data from EFM to CFM and conversion of OAM data from CFM to EFM.

12. The network element of claim 11, wherein the EFM-CFM translation module is adapted to generate an OAM alert flag sub-TLV in response to determining that the first EFM message includes OAM status information, and is adapted to insert the OAM alert flag sub-TLV into a continuity check CFM message.

13. A system in a radio access network (RAN), the system to support operations, management and administration (OAM) between network elements in a LowRAN portion of the RAN that support Ethernet in the first mile (EFM) and network elements in a HiRAN portion of the RAN that support connectivity fault management (CFM) in the radio access network, wherein the LowRAN portion is a point-to-point topology between a cell site and an aggregation node and wherein the HiRAN portion is a network of a plurality of aggregation nodes connected to a backhaul network of the RAN, the system comprising:

a cell site node adapted to generate a first EFM OAM message and to transmit the first EFM OAM message to a first aggregation node, wherein the cell site node supports EFM and the cell site node is on the LowRAN;

the first aggregation node adapted to process a first EFM message including OAM data received from cell site, wherein the first aggregation node supports CFM and wherein the first aggregation node is on the RAN, the first aggregation node adapted to convert OAM data from the first EFM message into a sub-type-length-value (TLV) of a first CFM message, adapted to process the first CFM message including the OAM data in the sub-TLV and adapted to transmit the first CFM message to a third network element on the RAN, wherein the third network element is an aggregation node on the HiRAN;

a second aggregation node adapted to receive the first CFM message and adapted to transmit a second CFM message to the first aggregation node, wherein the second aggregation node supports CFM and wherein the second aggregation node is on the HiRAN, whereby an end-to-end OAM sublayer is provided in the RAN between the cell site and the backhaul network by conversion of OAM data from EFM to CFM and conversion of OAM data from CFM to EFM.

14. The system of claim 13, wherein the first aggregation node is adapted to convert OAM data from the second CFM message into a second EFM message based on a sub-type-length-value (sub-TLV) in the second CFM message.

15. A system in a radio access network RAN the system to support operations, management and administration (OAM) between network elements that support Ethernet in the first mile (EFM) and network elements that support connectivity fault management (CFM) in the radio access network the system comprising:

a cell site node adapted to generate a first EFM OAM message and to transmit the first EFM OAM message to a first aggregation node, wherein the cell site node supports EFM and the cell site node is on the RAN;

the first aggregation node adapted to process a first EFM message including OAM data received from the cell site node, wherein the first aggregation node supports CFM and wherein the first aggregation node is on the RAN, the first aggregation node adapted to convert OAM data from the first EFM message into a sub-type-length-value (TLV) of a first CFM message adapted to process the first CFM message including the OAM data in the sub-TLV and adapted to transmit the first CFM message to a third network element on the RAN, wherein the first aggregation node is adapted to convert OAM data from a second CFM message into a second EFM message based on a sub-type-length-value (sub-TLV) in the second CFM message, wherein the first aggregation node is adapted to determine whether the OAM data in the second CFM message is an information OAM protocol data unit (OAMPDU) request, and is adapted to encapsulate the information OAMPDU as a sub-TLV of a response CFM message; and a second aggregation node adapted to receive the first CFM message and adapted to transmit the second CFM message to the first aggregation node, wherein the second aggregation node supports CFM and wherein the second aggregation node is on the RAN, whereby an end-to-end OAM sublayer is provided in the RAN by conversion of OAM data from EFM to CFM and conversion of OAM data from CFM to EFM.

16. The system of claim 15, wherein the first aggregation node is adapted to determine whether the OAM data in the second CFM message is an event notification OAM protocol data unit (OAMPDU) request, and is adapted to encapsulate the event notification OAMPDU as a sub-TLV of a response CFM message.

17. The system of claim 15, wherein the first aggregation node is adapted to encapsulate an OAM protocol data unit as a sub-TLV of a loop back CFM message, in response to determining that the first EFM message includes OAM data.

18. The system of claim 15, wherein the first aggregation node is adapted to generate an OAM alert flag sub-TLV in response to determining that the first EFM message includes OAM status information, and is adapted to insert the OAM alert flag sub-TLV into a continuity check CFM message.

* * * * *

UNITED STATES PATENT AND TRADEMARK OFFICE
CERTIFICATE OF CORRECTION

PATENT NO. : 8,411,701 B2  Page 1 of 1
APPLICATION NO. : 12/757774
DATED : April 2, 2013
INVENTOR(S) : Kini et al.

It is certified that error appears in the above-identified patent and that said Letters Patent is hereby corrected as shown below:

In the Specifications

In Column 4, Line 5, delete "apiece" and insert -- a piece --, therefor.

In Column 6, Line 51, delete "a OAMPDU" and insert -- an OAMPDU --, therefor.

In Column 7, Line 18, delete "quested" and insert -- requested --, therefor.

In the Claims

In Column 8, Line 62, in Claim 2, delete "operations" and insert -- operations, --, therefor.

In Column 9, Line 22, in Claim 3, delete "network" and insert -- network, --, therefor.

In Column 9, Line 65, in Claim 5, delete "operations" and insert -- operations, --, therefor.

In Column 10, Line 67, in Claim 9, delete "network" and insert -- network, --, therefor.

In Column 11, Lines 7-8, in Claim 9, delete "sub-TLV" and insert -- (sub-TLV) --, therefor.

In Column 11, Line 31, in Claim 11, delete "RAN" and insert -- (RAN), --, therefor.

In Column 11, Line 34, in Claim 11, delete "EFM" and insert -- (EFM) --, therefor.

In Column 11, Lines 43-44, in Claim 11, delete "sub-TLV" and insert -- (sub-TLV) --, therefor.

In Column 12, Line 36, in Claim 15, delete "RAN" and insert -- (RAN), --, therefor.

In Column 12, Line 40, in Claim 15, delete "network" and insert -- network, --, therefor.

In Column 12, Line 52, in Claim 15, delete "message" and insert -- message, --, therefor.

Signed and Sealed this
Fifteenth Day of October, 2013

Teresa Stanek Rea
*Deputy Director of the United States Patent and Trademark Office*